¹

3,281,261
METHOD OF PREPARING REFRACTORY METAL OXIDE COATED CARBONIZED ACRYLIC TEXTILE FIBERS
Jack A. Lynch, Spartanburg, S.C., assignor to Deering Milliken Research Corporation, Spartanburg, S.C., a corporation of Delaware
No Drawing. Filed Aug. 30, 1963, Ser. No. 305,860
4 Claims. (Cl. 117—46)

This invention relates to a process for carbonizing heat resistant textile materials and more specifically to a process for making refractory metal oxide coated carbonized textile materials.

Heat resistant fabrics have recently become of vital importance for use in missiles which are subjected to the effects of excess heat build-up at very high speeds. Since the heat resistance of carbon, except in the presence of an oxiding atmosphere is almost perfect, efforts have been made to produce carbonized fabrics having acceptable strength and flexibility. Fabrics of this type, when employed as a laminate between sheets of organic polymeric materials, have found application as liners for missile nose cones and missile exhaust orifices. Carbonized fabrics, however, are lacking in the strength and flexibility which is characteristic of the same fabric prior to carbonization. Carbonized fabrics are also subjected to rapid oxidation which diminishes the utility of the fabric even though it has high heat resistance.

It is therefore an object of this invention to provide a process for making carbonized fabric having increased strength and flexibility.

It is another object of this invention to provide a process for making carbonized fabric which has increased oxidation or flame resistance.

These and other objects of the invention will become apparent from the following description:

In accordance with this invention, it has now been discovered that a textile material having increased strength, flexibility and oxidation or flame resistance may be obtained by coating a fabric suitable for carbonization with a coating composition capable of producing a refractory metal oxide and then carbonizing the coated fabric in a suitable atmosphere.

It should be understood that the term refractory as employed herein is meant to include in addition to those compounds considered refractory in the classical sense, those compounds which have thermal stability at temperatures of 300° C. or greater. Compounds capable of producing refractory metal oxides which have been found to be suitable for purposes of this invention are compounds such as for instance

| | |
|---|---|
| $Al_2O_3$ | $Cs_2O$ |
| $Al_2O_3 \cdot K_2O \cdot SiO_2$ | $Cr_2O_3$ |
| $Al_2(SiF_6)_2$ | $Cr(PO_4) \cdot 3H_2O$ |
| $Al_2SiO_5$ | $CrO_2$ |
| $Sb_2O_3$ | $Co_2O_3$ |
| $BaO$ | $CuO$ |
| $BaSO_4$ | $CuOH$ |
| $Ba_2V_2O_7$ | $Cu_2Se$ |
| $3BeO \cdot Al_2O_3 \cdot 6SiO_2$ | $Fe_2O_3$ |
| $BeO$ | $Fe_3O_4$ |
| $H_3SO_3$ | $FeO$ |
| $B_2O_3$ | $HfO_2$ |
| $CdO$ | $L_2O_3$ |
| $Cd_2P_2O_7 \cdot 2H_2O$ | $PbO$ |
| $CdSiO_3$ | $PbWO_4$ |
| $CaO$ | $Li_4SiO_4$ |
| $CaSiO_3$ | $Li_2O$ |
| $CaSO_4$ | $MgO$ |
| $Ce_2O_3$ | $MnP_2O_7$ |

²

| | |
|---|---|
| $MnSiO_3$ | $TiO_2$ |
| $MoO_3$ | $Ti_2O_3$ |
| $Mo_2O_3$ | $WO_3$ |
| $NiO$ | $W_2Si_3$ |
| $Ni_2O_3$ | $UO_2$ |
| $SiO_2$ | $V_2O_3$ |
| $SnO$ | $V_2O_4$ |
| $SrSiO_3$ | $YCl_3$ |
| $SrO$ | $ZnO$ |
| $Ta_2O_5$ | $Zr(OH)_2$ |
| $Tl_2O_3$ | $ZrO_2$ |
| $TlO_2$ | |

The compounds are preferably substantially insoluble in the particular carrier employed in the coating composition in order to insure that the coating be a surface coating.

Fabrics suitable for use in this invention, that is to say, fabrics which are suitable for carbonizing operations are fabrics selected from the group consisting of viscose rayon fabrics, cotton fabrics and polyacrylic fiber fabrics. The refractory metal oxide may be applied by means of any of the well-known coating processes such as for instance, spraying, dip coating or padding. The refractory metal coating composition may be in the form of an aqueous dispersion or suspension or in the form of a dispersion or suspension which employs an organic carrying medium. The coating composition should be prepared in such proportions and applied in such a manner that a pickup of from 1% to 100% refractory metal compound based on the dry weight of the fabric is obtained and preferably from 25% to 50% based on the dry weight of the fabric.

In order to prevent the coating from breaking or sluffing off prior to carbonization or pyrolysis, it is preferred that a binder be employed in the dispersion or suspension. The binder may be any organic binder which will produce sufficient adhesion between the coating and the fabric substrate and which will not interfere with subsequent carbonization or pyrolysis operations. Suitable binders for purposes of this invention are binders such as for instance glycerol, water soluble polyurethanes, low molecular weight polyethylenes and acrylic resins.

In general, the carbonization or pyrolysis of the coated fabric is carried out by placing the fabric in a Hoskins oven or any heating apparatus capable of producing the desired temperature range in a preselected atmosphere and heating at a temperature of from about 300° C. to about 3,000° C. or higher. When the fiber being carbonized or pyrolyzed is a celluosic fiber such as for instance viscose rayon or cotton, it is essential that the carbonization be carried out in an inert atmosphere, such as for instance a nitrogen or argon atmosphere or in a reducing atmosphere such as for instance hydrogen or carbon monoxide. Where, however, the fiber being carbonized is an acrylic fiber, it is preferred that carbonization be conducted in an atmosphere which contains at least some oxygen. It has been found that an oxygen level of from about 10% to about 20% is to be preferred where the fiber being carbonized is an acrylic fiber such as for instance, Orlon (polyacrylic fiber marketed by E. I. du Pont de Nemours & Company). When an oxygen containing atmosphere is employed for the carbonization operation, it is preferred that temperatures of from about 180° C. to about 550° C. be employed. The period of time during which the fabrics are subjected to carbonization operations is dependent, of course, upon the exact temperature employed, however, a period of about one hour is usually sufficient to effect that degree of carbonization which is desired.

The following specific examples for the preparation of the refractory metal oxide coated carbonized fabric of

Example I

A titanium dioxide dispersion is prepared by mixing 20 grams of titanium dioxide in 50 grams of glycerine and 10 grams of water using 5 grams of N–95 (surface active agent marketed by Syn-Chem Corporation). The titanium dioxide dispersion is then padded onto the viscose rayon fabric swatch and dried. The dried sample is then washed four times in ethyl alcohol. The alcohol washed and dried viscose rayon fabric is then placed in an electric oven which has previously been flushed with nitrogen gas. The temperature of the oven is raised to 800° C. over a two-hour period and held at 800° C. for at least 15 minutes. The fabric is then allowed to cool while being maintained under a steady nitrogen gas flow. The fabric was found to have undergone an 80.3% weight loss from the pyrolysis operation. The sample, however, had a tremendous increase in strength over a viscose rayon swatch which had not been subjected to the titanium dioxide coating operations prior to carbonization.

Example II

The exact procedure of Example I is repeated with the exception that the titanium dioxide coating composition is padded onto a cotton fabric. The coated and carbonized cotton fabric is found to have a tremendous increase in strength over a corresponding cotton fabric which has not been treated with the titanium dioxide coating composition.

Example III

A zirconium oxide coating composition is prepared by dispersing 15 grams of zirconium oxide in 50 grams of glycerine and 10 grams of water containing 5 grams of N–95 (surfactant marketed by Syn-Chem Corporation). The zirconium oxide coating composition is then padded onto a swatch of Orlon fabric (polyacrylic fabric marketed by E. I. du Pont de Nemours and Company). The zirconium oxide coated fabric is then placed in an electric furnace employing an atmosphere having an oxygen level of from about 10% to about 20%. The fabric is maintained in the furnace at a temperature of about 275° C. for a period of about one hour. The zirconium oxide coated carbonized Orlon fabric is found to have improved strength characteristics over a comparable carbonized Orlon fabric which has not been given a zirconium oxide coating.

Example IV

An aluminum oxide dispersion is prepared by mixing 10 grams of aluminum oxide in 50 grams of glycerine and 10 grams of water using 5 grams of N–95 (surface active agent marketed by Syn-Chem Corporation). The aluminum oxide dispersion is then sprayed onto a viscose rayon fabric swatch and dried. The dried sample is then placed in an electric oven which has previously been flushed with carbon monoxide. The temperature of the oven is raised to 800° C. over a two-hour period and held at 800° C. for at least 15 minutes. The fabric is then allowed to cool while being maintained under a steady carbon monoxide gas flow. The resultant aluminum oxide carbonized fabric was found to have a tremendous increase in strength over a viscose rayon swatch which had not been subjected to aluminum oxide coating operations. The aluminum oxide coating on the carbonized fabric was also found to contain certain quantities of aluminum metal.

Example V

A zirconium hydroxide dispersion is prepared by mixing 15 grams of zirconium hydroxide in 10 grams of a water-soluble polyurethane and 10 grams of water using 5 grams of N–95 (surface active agent marketed by Syn-Chem Corporation). The zirconium hydroxide dispersion is then padded onto a cotton fabric swatch and dried. The dried sample is then washed four times in ethyl alcohol, the ethyl alcohol washed and dried cotton fabric is then placed in an electric oven which has previously been flushed with nitrogen gas. The temperature of the oven is raised to 1,000° C. over a two-hour period and held at 1,000° C. for at least 15 minutes. The fabric is then allowed to cool while being maintained under a steady nitrogen gas flow. The resultant carbonized fabric is found to contain a coating of zirconium oxide. The carbonized fabric has a tremendous increase in strength over a similar cotton swatch which had not been subjected to zirconium hydroxide coating operations prior to carbonization.

The improvement to be had in the strength and flexibility or strength and extensibility, extensibility being in itself a measurement of flexibility, for the refractory metal oxide coated carbonized textile materials of this invention is determined by conducting tests on fill fibers of refractory metal oxide coated carbonized textile materials compared with fill fibers of uncoated but similarly carbonized textile materials. Extensibility tests were performed on carbonized fabrics by removing fill yarns. The tests are carried out by locking individual strands of fill yarn in the jaws of an Instron testing machine. The secured sample is then loaded with the weight of 0.01 gram/grex. The load was then removed and the procedure repeated for two additional cycles. On completing the third cycle, measurements were taken to determine extensibility. Breaking strength was similarly determined by use of an Instron testing machine, individual strands of fill yarn again being placed in the jaws of the Instron testing machine and the secured sample then loaded with an increasing weight in grams until the breaking strength was reached. Tests conducted in this manner showed, for instance, that the sample prepared according to Example I given herein had a breaking strength of 91.1 grams for the fill yarn and a percent elongation of 4.39% for the fill yarn. A corresponding viscose control fabric which was subjected to the same carbonizing conditions as set forth in Example I but which was not coated with titanium dioxide had a breaking strength of 35.1 grams for fill yarn and a percent elongation of 2.62% for fill yarns. It may be readily seen from the foregoing data that a considerable improvement is obtained in both strength and extensibility by coating the fabric with refractory oxides prior to carbonization or pyrolysis treatment.

The flame resistance of the fabric is enhanced by the fact that the structure will maintain its fabric form even though all carbonaceous material has been removed through oxidation, that is to say the refractory metal oxide shell will retain the original configuration of the fabric even though the fabric has been subjected to ashing temperatures of sufficient intensity to remove all carbon. It should be understood that the fabric coated with the compound capable of producing refractory metal oxides need not be subjected to carbonization or pyrolysis prior to ashing but may be ashed directly after coating. It has been found that this refractory metal oxide coating shell may be subsequently fused subsequent to ashing so as to form a ceramic fabric having considerable strength. It should be appreciated that refractory metal oxide fibers are extremely difficult and expensive to form. Due to the high melting point and abrasive qualities of refractory metal oxides, these materials are not suitable for the usual hot melt extrusion methods for forming ceramic fibers such as for instance the methods employed in the extrusion of glass fibers. Fusion of the refractory metal oxide coating residue of the textile materials of this invention should take place at temperatures of about the melting point of the specific refractory oxide being fused, that is to say fusion temperatures for a titanium dioxide coating should be at about 1,640° C.; for zirconium oxide, about 2,700° C.; for aluminum oxide about 2,000° C.; for tungsten oxide about 2,130° C. It is preferred that the fusion temperature be conducted in conjunction with a pressure treatment so that maximum adherence will be obtained between the coating residues of the warp fibers and the coating residues of the fill fibers. It should also be understood that where increased quantities of metallic content are to be desired the fusion treatment should be conducted in a nonoxidizing atmosphere and where still higher quantities of metallic content are desired, the fusion should be conducted in a reducing atmosphere.

Having thus described the invention, what is claimed is:

1. A method for the preparation of carbonized textile materials comprising coating an acrylic textile material with a coating composition containing at least one compound capable of yielding a refractory metal oxide, and then carbonizing the coated textile material in an oxygen containing atmosphere having an oxygen level of from about 10% to about 20% by volume.

2. The method of claim 1 wherein said metal oxide is present in quantities such that from 1% to 100% of said compound is picked up, based on the dry weight of the fabric.

3. The method of claim 1 wherein said compound capable of yielding a refractory metal oxide is a compound having a cation selected from the group consisting of titanium, zirconium, aluminum and tungsten.

4. The method of claim 1 wherein said metal oxide is present in quantities such that from 25% to 50% of said compound is picked up based on the dry weight of the fabric.

References Cited by the Examiner

UNITED STATES PATENTS

| | | |
|---|---|---|
| 683,085 | 9/1901 | Voelker _____ 8—116 XR |
| 1,574,662 | 2/1926 | Leedom. |
| 1,856,756 | 5/1932 | Frigiola. |
| 2,875,501 | 3/1959 | Gravley _____ 264—59 |
| 3,090,094 | 5/1963 | Schwartzwalder et al. 264—59 XR |
| 3,111,396 | 11/1963 | Ball _____ 264—44 |
| 3,112,184 | 11/1963 | Hollenbach _____ 264—59 |
| 3,125,404 | 3/1964 | Crawley. |
| 3,133,133 | 5/1964 | Fairbanks _____ 264—59 |

ROBERT F. WHITE, *Primary Examiner.*

WILLIAM D. MARGIN, *Examiner.*

H. E. COLE, J. A. FINLAYSON, *Assistant Examiners.*